(12) United States Patent
Morris

(10) Patent No.: US 8,544,156 B2
(45) Date of Patent: Oct. 1, 2013

(54) APPARATUS AND METHOD FOR TRANSPORTING A FABRIC

(75) Inventor: Paul Morris, Bradford (GB)

(73) Assignee: Talon Technologies, Inc., Woodland Hills, CA (US)

(*) Notice: Subject to any disclaimer, the term of this patent is extended or adjusted under 35 U.S.C. 154(b) by 268 days.

(21) Appl. No.: 12/528,978

(22) PCT Filed: Feb. 26, 2008

(86) PCT No.: PCT/GB2008/000657
§ 371 (c)(1),
(2), (4) Date: Jan. 4, 2010

(87) PCT Pub. No.: WO2008/104768
PCT Pub. Date: Sep. 4, 2008

(65) Prior Publication Data
US 2010/0115745 A1    May 13, 2010

(30) Foreign Application Priority Data
Feb. 27, 2007   (GB) .................................. 0703728.6

(51) Int. Cl.
*D06C 21/00* (2006.01)
(52) U.S. Cl.
USPC .......................................................... 26/18.6
(58) Field of Classification Search
USPC ................. 26/18.6, 18.5, 27, 28, 99, 104, 19, 26/20; 492/28, 37; 271/272, 274, 275; 28/138, 28/116, 134, 156, 165; 226/171, 181, 190, 226/193
See application file for complete search history.

(56) References Cited

U.S. PATENT DOCUMENTS

| | | | | |
|---|---|---|---|---|
| 2,825,117 A * | 3/1958 | Evans et al. | .................... | 26/69 A |
| 2,890,515 A * | 6/1959 | Parker et al. | .................. | 26/69 A |
| 3,055,496 A * | 9/1962 | Dunlap | ........................ | 428/153 |
| 3,100,925 A * | 8/1963 | Messinger | .................... | 26/18.6 |
| 3,290,209 A * | 12/1966 | Ihrman | ......................... | 162/361 |
| 3,570,085 A * | 3/1971 | Heinemann | .................... | 28/112 |
| 3,894,318 A * | 7/1975 | Ito et al. | ............................ | 26/28 |
| 4,225,321 A * | 9/1980 | Swiatek | ......................... | 51/295 |
| 4,793,041 A * | 12/1988 | Jenkins et al. | .................. | 492/37 |
| 4,832,886 A * | 5/1989 | Douglas | .......................... | 264/41 |
| 4,894,196 A * | 1/1990 | Walton et al. | ................. | 264/282 |
| 5,988,635 A * | 11/1999 | Ohshima | ....................... | 271/274 |
| 6,200,248 B1 * | 3/2001 | Vestola et al. | ................. | 492/54 |
| 6,279,211 B1 * | 8/2001 | Dischler | ....................... | 26/18.6 |
| 2003/0154580 A1 * | 8/2003 | Overcash et al. | ................. | 26/27 |

FOREIGN PATENT DOCUMENTS

| | | |
|---|---|---|
| DE | 197 01 542 A1 | 7/1997 |
| EP | 0838419 A | 4/1998 |
| GB | 1409532 A | 10/1975 |
| GB | 2011028 A | 7/1979 |
| GB | 1579795 A | 11/1980 |
| JP | 8-038995 A | 2/1996 |

* cited by examiner

*Primary Examiner* — Amy Vanatta
(74) *Attorney, Agent, or Firm* — Brian Siritzky

(57) ABSTRACT

An apparatus for transporting a fabric having first and second transport faces for gripping a fabric therebetween and to displace the fabric along its length, in which at least one of the transport faces has an irregular surface.

22 Claims, 2 Drawing Sheets

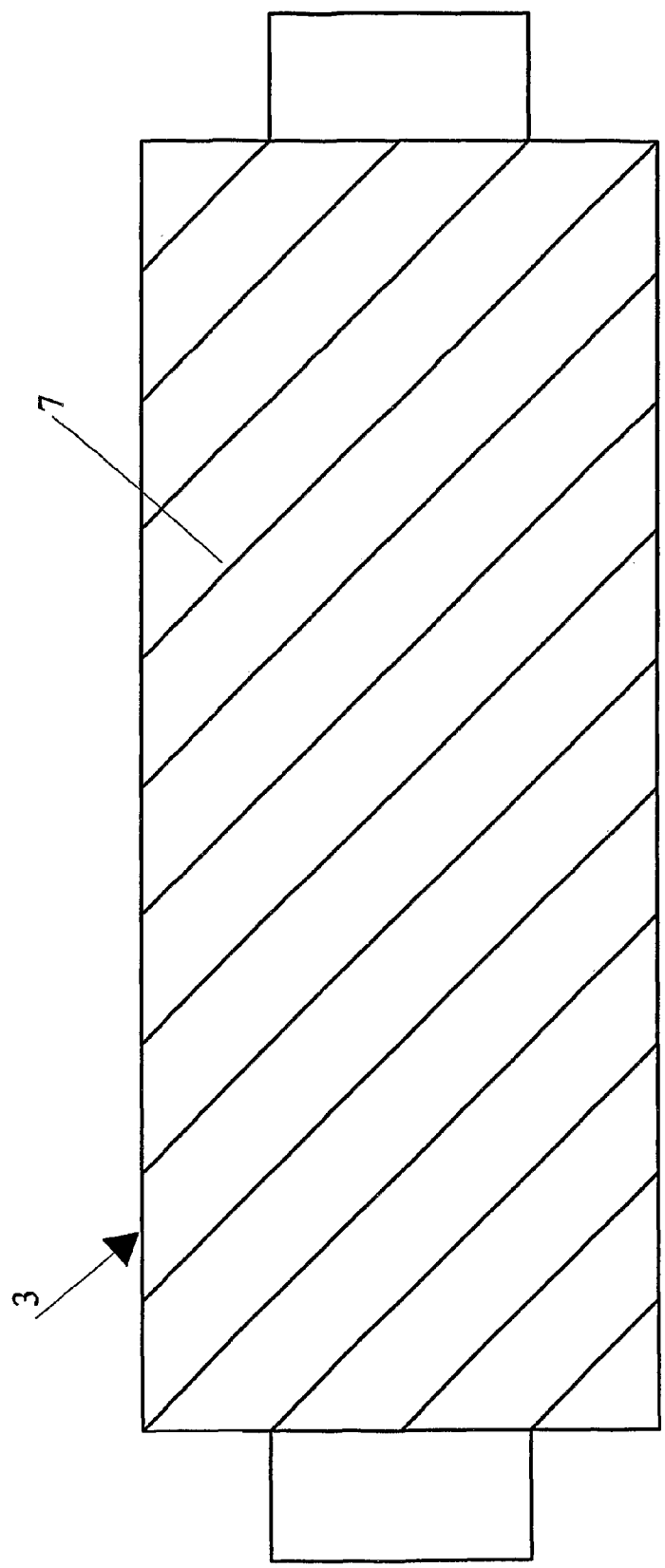

APPARATUS AND METHOD FOR TRANSPORTING A FABRIC

Figure 1:
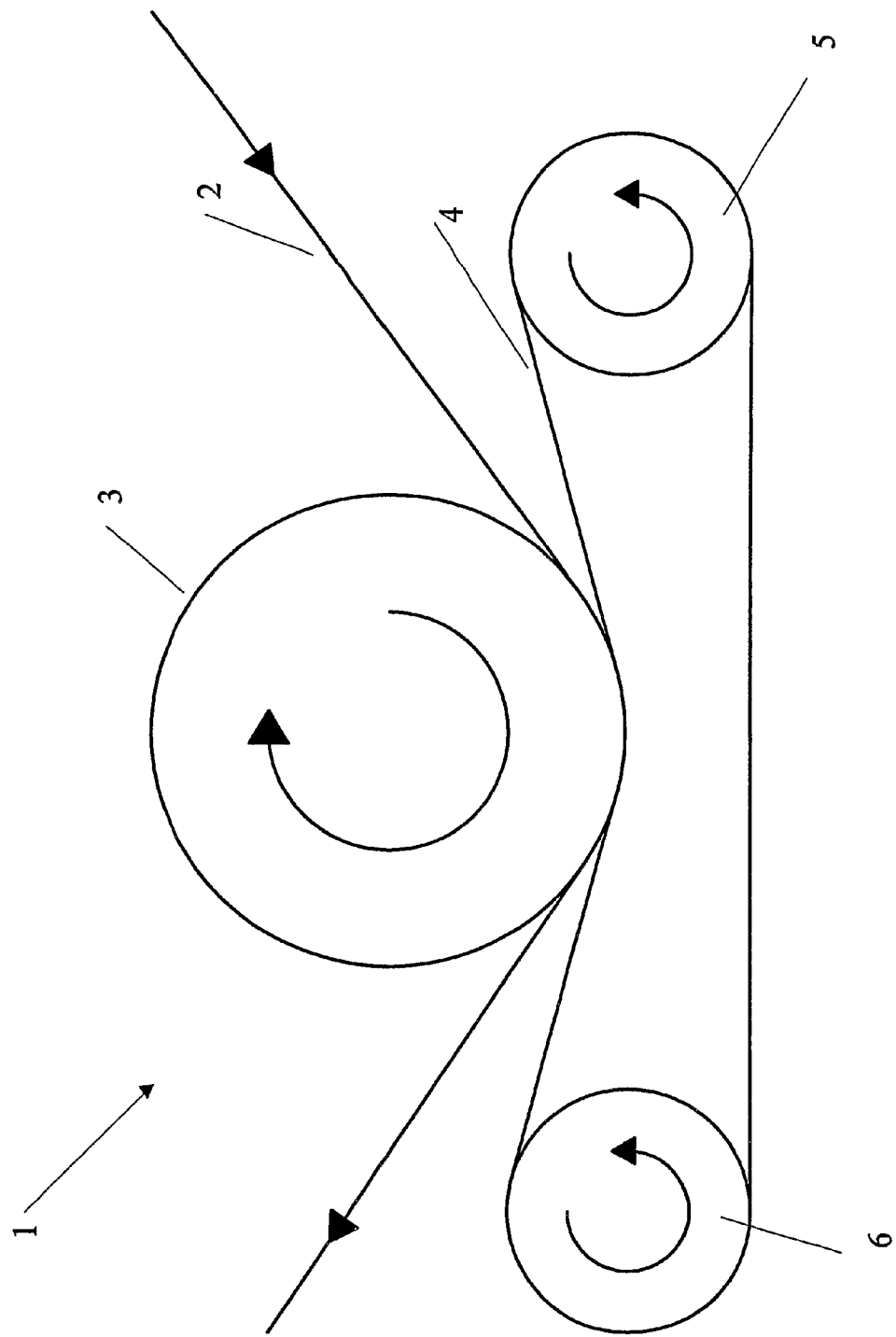

The present application represents the U.S. National Phase of P.C.T. Application No. PCT/GB2008/000657, filed Feb. 26, 2008, and claiming foreign priority on the basis of a corresponding United Kingdom patent application, filed Feb. 27, 2007.

The present invention relates to an apparatus and method for transporting a fabric. More particularly, but not exclusively, the present invention relates to an apparatus having first and second transport faces, at least one of the faces having an irregular surface.

Apparatus for transporting fabrics along their length are known. Such apparatus typically comprise first and second rollers arranged to nip the fabric therebetween to draw the fabric along its length.

Apparatus for imparting stretch to a fabric as the fabric is drawn along its length are also known. Such apparatus typically comprise a roller and a belt which abuts against the roller around a portion of its circumference. In use fabric is nipped between the roller and belt and drawn around the roller. The belt is compressible along its length so longitudinally compressing the fabric as it passes around the roller. Typically the roller is heated to 'fix' the fabric in its compressed state.

The roller is typically engraved to increase the grip between the roller and fabric. However, this significantly changes the appearance of the treated fabric. The apparatus according to the invention seeks to overcome this problem.

Accordingly, the present invention provides an apparatus for transporting a fabric comprising
first and second transport faces adapted to grip a fabric therebetween and to displace the fabric along its length;
characterised in that
at least one of the transport faces has an irregular surface.

The irregular surface of the roller prevents distortion of the surface of the fabric as it passes through the apparatus.

Preferably, both first and second transport faces have irregular surfaces.

Preferably, at least one of the transport faces is a roller.

Both of the transport faces can be rollers.

Alternatively, one transport face can be a roller and the other transport face can be a belt extending partially around the roller.

Preferably, the belt is compressible along its length.

The roller can be heated.

Preferably, the irregular surface is a powder coating.

The powder coating can comprise a mixture of aluminium oxide and titanium oxide.

The particle sizes of the powder coating can be in the range 10 μm to 50 μm, preferably 10 μm to 40 μm, more preferably 15 μm to 35 μm.

The powder coating can be further coated with a sealant, preferably a cyanoacrylate sealer.

In a further aspect of the invention there is provided a method of transporting a fabric comprising the steps of
providing first and second transport faces adapted to grip a fabric therebetween and transport the fabric along its length, one of the transport faces having an irregular surface; and,
providing a fabric between the transport faces.

Preferably, the transport face having an irregular surface is a roller.

Preferably, the remaining transport face is a belt extending partially around the roller, the belt preferably being compressible along its length so as to compress the fabric as it passes between the transport plates.

The roller can be heated.

The present invention will now be described by way of example only and not in any limitative sense with reference to the accompanying in which FIG. 1 shows an apparatus according to the invention in cross section; and, FIG. 2 shows a known roller in side view.

Shown in FIG. 1 is an apparatus 1 for transporting a fabric 2 according to the invention. The apparatus 1 comprises first and second transport faces 3,4 comprising a heated driven roller 3 and a belt 4 which extends partially around the circumference of the roller 3 respectively. A rotation means (not shown) rotates the roller 3 about its axis. Roller 3 rotates the belt 4 in a loop around second and third rollers 5,6 such that the belt 4 is transported at the same speed as the surface of the heated roller 3 at the point of contact with the heated roller 3.

In use the fabric 2 to be transported is gripped between the heated roller 3 and belt 4 and transported around the heated roller 3 as shown. The belt 4 is compressible so compressing the fabric 2 whilst it is gripped. The fabric 2 is 'set' by the heat from the roller 3 whilst in this compressed state.

A known heated roller 3 is shown in side view in FIG. 2. The roller 3 is engraved with parallel lines 7 (typically around 140 lines per inch) to provide the roller 3 with grip on the fabric 2.

The engraved lines 7 significantly alter the appearance of the resulting fabric 2. On fine woven rayons and silks it produces a moiré effect. On cotton twill fabrics it distorts the twill giving the appearance of pilling. These effects are thought to be as a result of the interaction between the engraved lines 7 on the roller 3 and the yarns in the fabric 2. This effect is particularly pronounced when the ratio of the separation of the roller lines to the separation of the yarns of the fabric is a low order ratio (for example 2:1, 3:1, 3:2, etc).

The roller 3 of the apparatus according to the invention has an irregular surface, i.e. it does not comprise a repeating pattern which may interact with the yarns of the fabric. The surface of this embodiment is a coating of a ceramic powder. The powder is a mixture of aluminium oxide and titanium dioxide in the ratio of around 60%:40%. The particle size is 35 mesh (15 to 35 μm).

The powder coating is applied by a plasma generator (typically 50 kw) using a mixture of argon and nitrogen gases as the plasma medium. The plasma temperature is typically around 20,000° C. The ceramic is applied in several passes until the required coverage is achieved.

The coated roller 3 is treated with a cyanoacrylate sealer to prevent contamination during its working life. Finally, the roller 3 is lapped with 30 μm aluminium oxide rapid oscillating belt until it has a surface finish averaging around 3.7 RA at 2.5 mm.

In other embodiments different ratios of aluminium oxide and titanium dioxide particles are possible. In other embodiments other powders (both ceramic and non-ceramic) are possible. Other sizes of particle are also possible.

The belt 4 is typically a rubber material, providing sufficient flexibility to compress the fabric 2 and roughness to grip it. Other flexible materials, both flexible and none flexible are possible in alternative embodiments.

In a further embodiment both transport faces 3,4 are rollers arranged to nip the fabric 2 therebetween The surface of one roller can be smooth and the other irregular. Alternatively, the surfaces of both rollers can be irregular.

The invention claimed is:

1. An apparatus for transporting a fabric, the apparatus comprising:

a first transport face and a second transport face for gripping the fabric therebetween for displacing the fabric along its length, wherein said first transport face comprises a roller, and said second transport face comprises a belt extending partially around the first roller and wherein said first transport face has a first irregular surface and said second transport face has a second irregular surface, wherein the first irregular surface comprises a powder coating comprising particles having sizes in the range of 10 μm to 50 μm.

2. The apparatus for transporting a fabric according to claim 1, wherein the belt of said second transport face is compressible along its length for compressing the fabric as the fabric passes between said first transport face and said second transport face.

3. The apparatus for transporting a fabric according to claim 1, wherein said roller is heated.

4. The apparatus for transporting a fabric according to claim 3, wherein at least one of the first irregular surface and the second irregular surface comprises a powder coating.

5. The apparatus for transporting a fabric according to claim 1, wherein the powder coating comprises a mixture of aluminum oxide and titanium oxide.

6. The apparatus for transporting a fabric according to claim 5, wherein said power coating comprises particles having sizes in the range of 10 μm to 40 μm.

7. The apparatus for transporting a fabric according to claim 6, wherein said powder coating comprises particles having sizes in the range of 15 μm to 35 μm.

8. The apparatus for transporting a fabric according to claim 5, wherein said powder coating is coated with a sealant.

9. The apparatus for transporting a fabric according to claim 8, wherein said sealant comprises cyanoacrylate sealer.

10. The apparatus of claim 5 wherein the mixture of aluminum oxide and titanium oxide is in a ratio of about 60%:40%.

11. The apparatus of claim 1 wherein said first transport face has a surface finish averaging around 3.7 RA at 2.5 mm.

12. The method of claim 5 wherein said first transport face has a surface finish averaging around 3.7 RA at 2.5 mm.

13. A method for transporting a fabric, the method comprising the steps of:

providing a first transport face and a second transport face for gripping the fabric therebetween and transporting the fabric along its length, wherein the first transport face comprises a roller, and wherein said first transport face has a first irregular surface and, said second transport face has a second irregular surface, wherein the roller is heated and wherein the first irregular surface comprises a powder coated with a sealant comprising cyanoacrylate sealer, and wherein the powder coating comprises a mixture of aluminum oxide and titanium oxide, wherein said powder coating comprises particles having sizes in the range of 10 μm to 50 μm, wherein said second transport face comprises a belt extending partially around said roller; and providing the fabric between said first transport face and said second transport face.

14. The method for transporting a fabric according to claim 13, wherein said belt is compressible along its length for compressing the fabric as the fabric passes between said first transport face and said second transport face.

15. The method of claim 13, wherein said powder coating comprises particles having sizes in the range of 10 μm to 40 μm.

16. The method of claim 13, wherein said powder coating comprises particles having sizes in the range of 15 μm to 35 μm.

17. The method of claim 13 wherein the mixture of aluminum oxide and titanium oxide is in a ratio of about 60%:40%.

18. An apparatus comprising:

a first transport face and a second transport face for gripping a fabric therebetween and for displacing the fabric along its length, wherein said first transport face comprises a roller, and wherein said first transport face comprises a first irregular surface; and wherein said second transport face comprises a second irregular surface, and wherein said first irregular surface comprises a powder coating comprising a mixture of aluminum oxide and titanium oxide, wherein said powder coating comprises particles having sizes in the range of 10 μm to 50 μm, and wherein said powder coating is coated with a sealant comprising cyanoacrylate sealer.

19. The apparatus of claim 18 wherein said powder coating comprises particles having sizes in the range of 10 μm to 40 μm.

20. The apparatus of claim 19 wherein said powder coating comprises particles having sizes in the range of 15 μm to 35 μm.

21. The apparatus of claim 18 wherein the mixture of aluminum oxide and titanium oxide is in a ratio of about 60%:40%.

22. The apparatus of claim 18 wherein said first transport face has a surface finish averaging around 3.7 RA at 2.5 mm.

* * * * *